(12) United States Patent
Benson et al.

(10) Patent No.: US 7,810,100 B2
(45) Date of Patent: Oct. 5, 2010

(54) EMPLOYING A SERVICING USER-INTERFACE SHELL TO SERVICE A PRESENTED USER-INTERFACE SHELL

(75) Inventors: Rodger W. Benson, Seattle, WA (US); David R. Fulmer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1454 days.

(21) Appl. No.: 11/202,832

(22) Filed: Aug. 12, 2005

(65) Prior Publication Data
US 2007/0038940 A1 Feb. 15, 2007

(51) Int. Cl.
G06F 3/00 (2006.01)
G06F 9/44 (2006.01)
G06F 9/46 (2006.01)

(52) U.S. Cl. .................. 719/313; 719/320; 719/328; 715/700

(58) Field of Classification Search .................. 719/313, 719/320, 328
See application file for complete search history.

(56) References Cited

U.S. PATENT DOCUMENTS

| 5,790,120 A | 8/1998 | Lozares et al. |
| 5,812,129 A | 9/1998 | Kacor et al. |
| 5,892,905 A | 4/1999 | Brandt et al. |
| 6,516,356 B1 | 2/2003 | Belknap et al. |
| 6,732,365 B2 | 5/2004 | Belknap et al. |
| 7,275,221 B2 * | 9/2007 | McKeon ...................... 715/853 |
| 7,487,460 B2 * | 2/2009 | Benson et al. .............. 715/767 |
| 2003/0070001 A1 | 4/2003 | Belknap et al. |

FOREIGN PATENT DOCUMENTS

| EP | 1460525 A2 | 9/2004 |
| GB | 2330671 A | 6/2002 |
| IE | 980729 A1 | 2/2000 |
| JP | 10247183 A | 9/1998 |
| JP | 11175390 A | 7/1999 |

OTHER PUBLICATIONS

Supplementary European Search Report; Application No. EP 06813369; Nov. 21, 2008, 8 pages.
Alan Crawford, with the Scotsman; "Hard Slog Starting to Pay Off for DataCore,", Mar. 4, 1998, 2 pps.
"Procession 'Quick Start' Guide," A Brief Guide for Process Developers, pp. 1-60.
"Procession: The Business Process System," DataCore, Buckinghamshire, United Kingdom, 4 pps.
"Procession Delivers Performance Management Through a Process Application Development Platform," Dec. 1, 2004, 1 pp.

(Continued)

Primary Examiner—Hyung S Sough
Assistant Examiner—Qing Wu
(74) Attorney, Agent, or Firm—Shook, Hardy & Bacon L.L.P.

(57) ABSTRACT

A set of embodied Application Program Interface(s) (112) are provided for facilitating a method of presenting a presented user-interface shell (UIS) (114) that cooperates with a servicing user-interface shell (UIS) (116). The method includes receiving data indicative of one or more tasks to be completed, coordinating the completion of said one or more tasks, and returning control to said presented UIS (114).

8 Claims, 3 Drawing Sheets

OTHER PUBLICATIONS

Mark Smith, with Ventana Research; "Procession Drives a Process of Change for Business," Jan. 21, 2004, 2 pps.

Michael Thompson, "Operations: Business Process Management Technology Audit," Apr. 2004, pp. 1-8.

"Procession: Process Management for the E-World," Procession Limited, Chesham, Bucks, 4 pps.

"Procession: Grant Management System," Procession Limited, Chesham, Bucks, 4 pps.

John R. Collings, Leon R. Crisp, W.M. Arnold, "Datacore Limited Requirement Specification for Procession: The Windows ProcessFlow Product," Feb. 27, 1996, pp. 1-37.

"Conspectus: The IT Report for Decision makers and Consultants: Workflow & Document Management Technology," Sep. 1997, 3 pps.

Andy Kellett, "Operations: Business Process Management Research Paper: Procession V4.1," Mar. 2002, pp. 1-8.

\* cited by examiner

EMPLOYING A SERVICING USER-INTERFACE SHELL TO SERVICE A PRESENTED USER-INTERFACE SHELL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Personal computers (used herein to contemplate an array of computing devices) continue to evolve into devices that are as much or more at home in the living room than the office. For example, a popular use for PCs is to use them as DVRs (digital video recorders), sometimes known as PVRs (personal video recorders). Used in this way, a PC can record media programming such as television programs of interest for subsequent playback, or download to external devices. One of the evolutionary aspects associated with computers that is broadening their uses includes the evolution of its user interface (UI).

Historically, computers have been interacted with by what will be referred to herein as a two-foot UI, or proximity UI. A two-foot UI is designed to be used in connection with a user who is approximately two feet away, or about an arm's length, from a computer screen. Almost all of the graphical user interfaces (GUIs) that have been designed for computers are two-foot UIs. But recently, the idea of a ten-foot UI has materialized. A ten-foot UI facilitates interaction with a computer from a greater distance—on the order of a television-viewing distance. Another descriptive term for this type of UI includes a "Distance User Interface" (DUI). Of course, the term "ten-foot UI" or "DUI" does not contemplate interacting with the computer at only a precise ten feet, but rather is used herein to describe the concept of operating a PC from about a television-viewing distance.

An example of such a DUI is described in co-pending application Ser. No. 10/174,619, entitled "User Interface for Operating a Computer From A Distance". An example of another such system and the interaction therewith can be found in U.S. Pat. No. 6,313,851 entitled "User Friendly Remote System Interface" and U.S. Pat. No. 6,898,765 entitled "User-Friendly Remote System Interface With Menu Highlighting." Each of these references is expressly incorporated by reference herein.

A user-interface shell (UIS) is type of environment that interacts with a variety of applications (including a computer's operating system) to control the presentation of data to a user. Generally, ten-foot UI applications are not compatible with systems that present ten-foot UIs. Just as applications need to be configured to work in connection with a two-foot UI, applications must be configured to work in connection with a ten-foot UI. Such configuration can be particularly problematic for both software developers and UI developers.

One of the reasons that this is problematic is associated with ensuring interoperability. That is, a UI must be compatible with a desired application. Software vendors must make their applications compatible with the UI that is going to be used to present data associated with its application. The more shells that are to be interacted with, the greater the burden faced by a software vendor to develop applications that can be used by a large pool of people.

One potential resolution to this issue is to provide only a single UI, as applicable here, a single ten-foot UI. This scenario would be great for independent software vendors (ISVs) because they would need to program their applications to interact with only a single ten-foot UI. But this scenario leaves much to be desired from other software manufacturers, especially those in the business of developing alternative UI shells (alternative to a first, or default shell). It may be the case that a certain software vendor wants to provide a customized ten-foot UI. But that entity that wants to develop a customized ten-foot UI is faced with the daunting task of ensuring that its UI is compatible with various products offered by various other software vendors, absent the present invention.

Moreover, if the vendor were to try to independently develop an alternative UIS, such as an alternative ten-foot UIS, then although it would be able to customize its shell with functionality, branding, etc., it would still need to be able to accomplish all of the tasks of a UIS (communicating with other applications and hardware devices, etc.). Such an endeavor would not only be resource-intensive but would be associated with a high degree of uncertainty regarding the extent to which it will be received by the market and compatible with various hardware and software products. As such, the current state of the art could be improved by providing, among other things, a method and system for allowing a desired software vendor to provide a customized ten-foot UI while not bearing the burden associated with developing a fully interoperable UI.

SUMMARY

Embodiments of the present invention solve at least the above problems by providing a system and method for, among other things, facilitating interaction with one or more computing devices by employing a first UIS to service a second one. The present invention extends a client/servicer type of relationship to user interfaces. The present invention has several practical applications in the technical arts including easing the development of UI shells, and thereby reducing the resources associated with making alternative UI shells available to operating computing systems.

In a first illustrative aspect, an Application Program Interface (API) (which may be composed of several component interfaces) is provided to facilitate a method of presenting a presented UI that cooperates with the servicing user-interface shell (UIS). The method includes receiving data indicative of tasks to be completed, coordinating the completion of the tasks, and returning control to the presented UI.

In a second illustrative aspect, an embodiment of the present invention takes the form of a computer-implemented method that includes servicing a first graphical UIS with a second UIS. The first UIS can be a client UIS, the second UIS is a servicing UIS, and the first UIS is serviced by the second UIS.

In a third illustrative aspect, an embodiment of the present invention includes servicing a first UI environment with a second UI environment.

In a fourth illustrative aspect, an embodiment of the present invention is a computer-program product for performing a method to facilitate interaction with one or more computing devices that has at least two UI shells. The method includes employing a first UIS that is not presented to a user to service a second UIS that is presented to a user.

In a final illustrative aspect, an embodiment of the present invention is a displayable UIS embodied on one more computer-readable media that is serviced by a nondisplayed UIS.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

As previously mentioned, a UI developer may wish to design its own look and feel of a ten-foot UI and have such a look and feel presented to a user without also undertaking the tasks associated with creating an independent UI that is compatible with various operating systems, third-party applications, hardware devices, and the like. A solution described herein is to have a first user-interface shell (UIS) service a second UIS (an alternative or customized UIS) so that the computer user will see a customized UI, but that customized UI will operate in connection with a servicing UI that does the traditional "heavy lifting" associated with an independent UI. A UI shell is a type of UI environment.

In a way, an aspect of an embodiment of the present invention could be described as a facade. The client UI is a sort of facade that is presented to a user. Thus, the client shell is presented whereas the servicing shell is not in an embodiment. According to various embodiments of the present invention, a servicing UIS becomes a universal UI (not displayed but displayable if need be) that facilitates data exchange between a client UI on the one end, and data exchange between the various applications and other components on the other end.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| API | Application Program Interface |
| Servicing UIS | A user-interface shell that services another user-interface shell, which is referred to as a client UI shell |
| Client UIS | A user-interface shell that is serviced by another user-interface shell, which is referred to as a servicing UIS |
| ISV | Independent Software Vendor |
| ten-foot UI/DUI | ten-foot user interface/Distance User Interface (to operate a computer at about a television-viewing distance) |
| two-foot UI | two-foot user interface (to operate a computer at about a television-viewing distance) |
| UI | User Interface |
| UIS | User Interface Shell |

Figures 1, 1A:
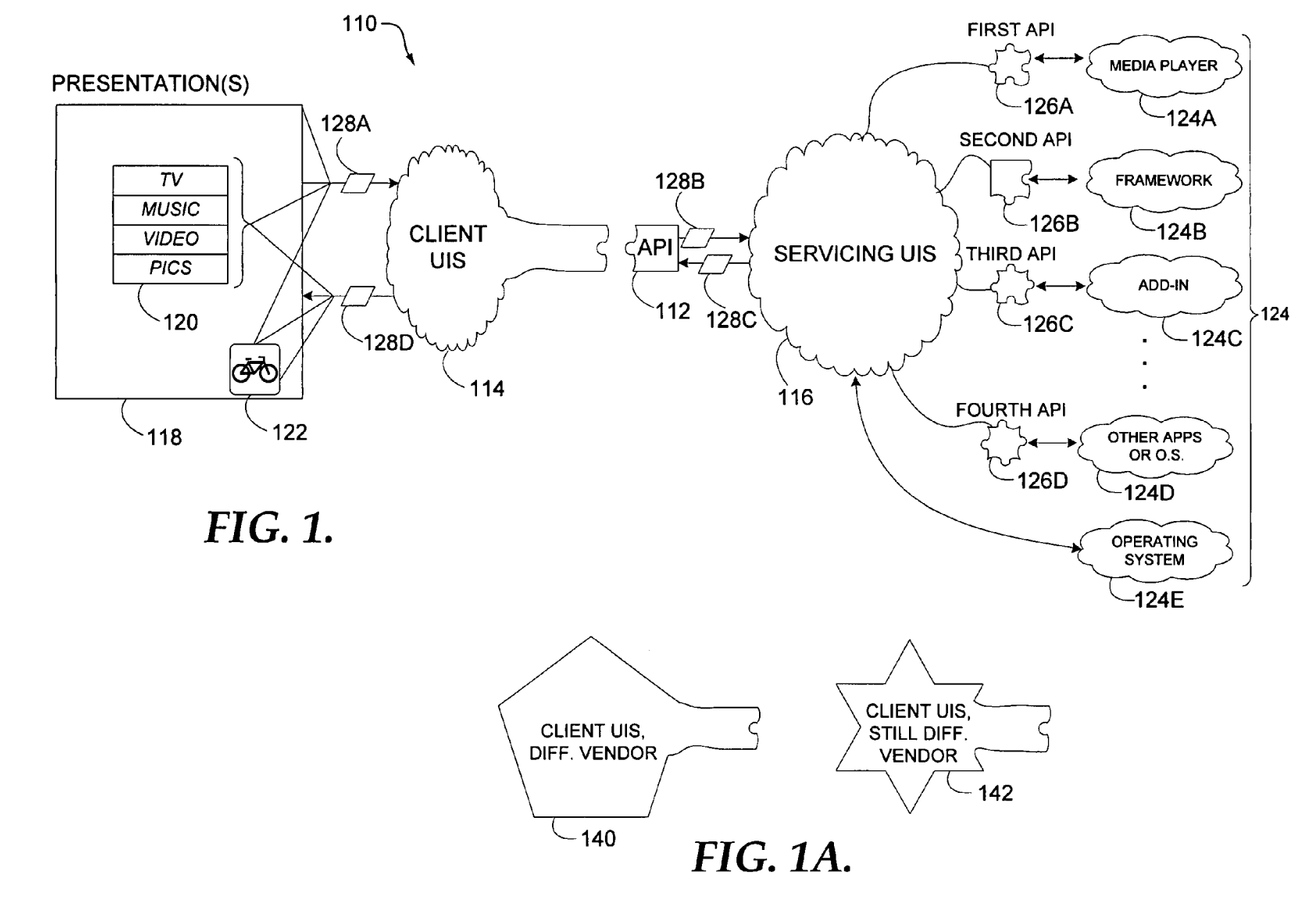
FIG. 1 is a block diagram illustrating an exemplary embodiment of the present invention.
FIG. 1A depicts illustrative alternative client UI shells in accordance with an exemplary embodiment of the present invention.

Turning now to FIG. 1, an exemplary embodiment of the present invention is provided and referenced generally by the numeral 110. An API 112 is referenced. API 112 may be made up of a set of constituent components that expose various functional aspects by way of methods and the like, but herein, it will be predominately referred to in the singular so as to not obscure the present invention and to make for easier reading. API 112 facilitates communication between the client UIS 114, which is serviced by the servicing UIS 116 in one embodiment.

The servicing UIS 116 acts as a sort of server component, servicing the requests of the client UIS 114, which acts as a sort of client with respect to UIS 116. Each UIS can either directly or indirectly host other applications according to embodiments of the present invention.

Although various networks are not shown in FIG. 1 so as to not obscure the present invention, it is the case that such networks are well contemplated within the scope of the invention. For example, the servicing UIS 116 and the client UIS 114 may reside on different devices, such as different PCs, coupled to each other by one or more networks. As alluded to above, the shells may work in client-server type of arrangement across a network, wherein for example, client UIS 114 is serviced as a sort of client by the servicing UIS 116, acting as a sort of server to complete comparatively more resource-intensive tasks. Although the terms "client" and "server" (and variations such as "servicing") are used herein, they are done so to describe various functional aspects of the shells. They are not necessarily "clients" or "servers" per se, in the sense of the historical meaning of those terms. But the terms convey concepts associated with the present invention.

Summarily, client UIS 114 is any UI shell that submits requests to be fulfilled by another UI shell. A servicing UI shell is an shell that services (receives reqests, compelets tasks, etc., explained below) another UI shell. The client UIS 114 is serviced by the servicing UIS 116. But users may not even know that servicing UIS 116 exists, because a user would only see components (such as UI components) associated with client UIS 114. Similarly, some applications may not even know that client UIS 114 exists, because they interact with servicing UIS 116, which then passes data or variations of data on to client UIS 114 in one embodiment.

Various visual elements or data components are presented on a display device in a presentation area 118, which may take the form being on a computer monitor, handheld device, and the like. Presentation area 118 shows some illustrative components such as a user-selection area 120 and an inset 122 that can be used for things like playing video, viewing pictures, or viewing feeds from the servicing UIS 116, which interacts with a set of applications generally referred to by the numeral 124. The references alluded to earlier explain in detail components, navigation, etc. of an illustrative DUI.

The set of applications 124 are illustrative and include such exemplary items as a media player 124A, a software framework 124B, a computer or software add-in 124C, other applications or even an operating system 124D, or the operating system itself 124E, which is shown as possibly directly operating with the servicing UIS 116 in one embodiment, as opposed to communicating to the aforementioned applications 124 via respective interfaces such as first API 126A, second API 126B, third API 126C, and fourth API 126D.

Portions of data are referred to by numerals 128A-D, but may be referred to generally herein as numeral 128 to convey the concept of data generally traveling between either presentation area 118 and the client UIS 114, or between the client UIS 114 and the servicing UIS 116. But more specifically, data portion 128A corresponds to data received from presentation area 118 to the client UIS 114; reference numeral 128B refers to data exchanged from API 112 to the servicing UIS 116; data portion 128C refers to data communicated from the servicing UIS 116 to API 112; and data portion 128D refers to data communicated from the client UIS 114 to presentation area 118. Dataflow is shown for illustrative purposes in block-diagram form. Actual data flow may differ from that shown because of the actual nature of data flow, but such is contemplated within the scope of the claims below.

The shapes and symbols used in FIG. 1 should not be construed as an attempt to conform to any flowchart standards per se wherein certain shapes mean certain things. Rather, the diagram pictorially highlights some of the various practical applications and benefits in the technical arts offered by the present invention. For instance, the use of puzzle pieces to pictorially illustrate the concept of an application program interface is employed. For example, FIG. 1 illustrates that the client UIS 114 is compatible API 112.

The servicing UIS 116 is associated with an array of APIs 126A-126D that interact with various software applications 124. As used herein, the term "software applications" is used broadly and contemplates things like executable files, libraries, and other software components used in a computing system. As shown, a first API 126A may facilitate interaction with a certain media player 124A. Although not shown, a different API may be used to interact with a different media player, or the case may be that all media players interact with first API 126A. Similarly, framework 124B may require API 126B in order for it to be communicated with. An illustrative framework includes the ".NET Framework" offered by the Microsoft Corporation.

Another example where a customized interface may be necessary to communicate with the servicing UIS 116 includes that of add-in 124C, which uses third API 126C. Attempting to list all of the various APIs associated with interacting with numerous software applications available would obscure the focus of the present invention. Thus, an ellipsis is shown to indicate that many more APIs than those shown in FIG. 1 are specifically contemplated herein. A final illustrative API, fourth API 126D, is shown as used to interact with other applications or an operating system 124D. Of course, the servicing UIS 116 may interact with operating system 124E directly or with various other software programs directly.

But in accordance with an embodiment of the present invention, the client UIS 114 does not even need to be aware of first API 126A, second API 126B, etc., nor of direct links to operating system 124E because knowing how to interact with the servicing UIS 116 via API 112 is sufficient to indirectly interact with the other components.

The client UIS 114 allows a customized display 118 to be presented to a user. As input data is received from the user via a customized the client UIS 114, that data can be passed via API 112 to the servicing UIS 116, which coordinates the completion of various tasks asked of it by the client UIS 114. In this way, a developer is afforded the opportunity to customize a display without having to deal with the compatibility issues associated with developing its own full-blown shell, such as the servicing UIS 116.

In one embodiment of the present invention, the servicing UIS 116 is a ten-foot UIS that does not itself display its own components in presentation area 118, but rather facilitates the display of such components by the client UIS 114 via API 112. In this embodiment, the client UIS 114 is an alternative ten-foot UI (alternative to UIS 116) that is customized with respect to the servicing UIS 116. Although API 112 has been and will continue to be referred to in the singular for the sake of expediency, as previously mentioned, the present invention contemplates that API 112 may be composed of multiple application program interfaces. The present invention, among other things, exposes these APIs to allow software vendors to present what they want presented via an alternate shell, such as the client UIS 114.

In one embodiment, the servicing UIS 116 services the client UIS 114 such that data, tasks, etc., can be received by the client UIS 114 and passed on to the servicing UIS 116 to facilitate the completion of those tasks, and, if applicable, return data to the client UIS 114 for its use including presenting data in presentation area 118.

In one embodiment, the servicing UIS 116 may be a modified version of a UIS that traditionally presents data itself for a user to see. In its modified state, rather than presenting components itself, the servicing UIS 116 employs the measures associated with graphical depiction to facilitate the displaying of data desired by the client UIS 114. In one aspect, the servicing UIS 116 operates in an invisible mode to service a third-party application such as the client UIS 114.

Thus, whereas absent the servicing UIS 116, the client UIS 114 would need to know how to interact directly with a software applications 124, employing an embodiment of the present invention, the client UIS 114 would forego that necessity. The client UIS 114 would need to be configured only to interact through API 112 with the servicing UIS 116. Similarly, software developers such as the makers of software applications 124 can continue to develop their products to work in connection with a single API, such as one of APIs 126A-126D. Consider the illustrative example wherein first API 126A represents an API that allows servicing-UIS 114 to work with a media player. A media-player developer does not need to provide various iterations of its software 124A to work with both UIS 116 and the client UIS 114, but rather, only with the servicing UIS 116.

Turning briefly to FIG. 1A, the client UIS of a different vendor 140 is shown alongside the client UIS of still a different vendor 142. By employing an embodiment of the present invention, the media player 124A (or whatever application) does not need to be concerned with various client ten-foot UI shells such as the client UIS 140 or 142. Note that UIS 140 and 142 are shown pictorially to have an arm that is designed to be compatible with and interact with API 112. This is because the only API that an alternative-UI developer needs to be concerned with is API 112. If a UI developer can make the UI that uses API 112 in connection with the servicing UIS 116, then by virtue of the nature of the servicing UIS 116, the developer has availed itself of the indirect control of any application at the disposal of the servicing UIS 116. The servicing UIS 116 can act as a standard execution environment so that the client UI shells (such as 114, 140, 142) and applications 124 need only be tested against the servicing UIS 116.

Figure 2:
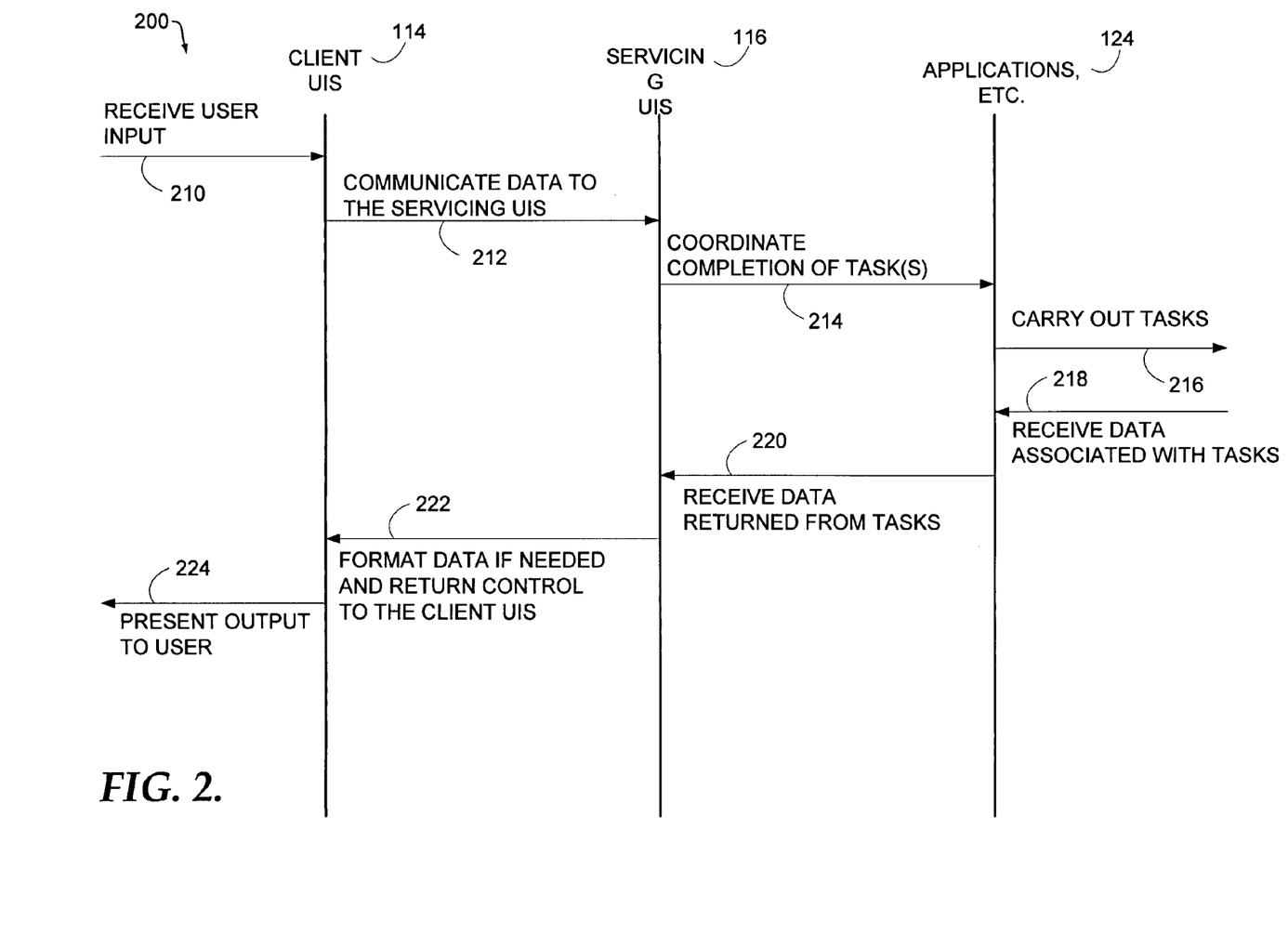
FIG. 2 is a flowchart illustrating the steps of an illustrative embodiment of the present invention.

Turning now to FIG. 2, an illustrative method for facilitating interaction with a computing device is provided and referenced generally by the numeral 200. The steps of process 200 will be described in connection with the components described in FIG. 1A. The following steps are of but one embodiment, are meant to be illustrative in nature, and should not be construed as limiting in nature; but rather to illustrate various functional aspects of an embodiment of the present invention.

In one embodiment, user input is received at a step 210 by the client UIS 114. The nature of this user input may be that of selecting a representation in presentation area 118, a mouse click, a keyboard command received from a wireless keyboard, for example, a stimulus received from a remote control such as to play music or videos from selection area 120, etc. User input is not limited to input by a human being but in some embodiments may contemplate input received from another machine or component of the same machine.

Based on the user input received at step 210, data is communicated to the servicing UIS 116 at a step 212. In one embodiment, this data communicated may be data component 128A. Data 128A may be the exact data received via the user input of step 210 or it may be a variation or supplementation thereof. Following is an example that fleshes out this concept.

A user may desire to navigate to a certain channel, and data 128A will include both a designation of the desired channel and also a set of instructions associated with presenting a display area in which to display the desired television program. Accordingly, at a step 214, the servicing-UIS coordinates the completion of whatever tasks are associated with the data received in step 212. These tasks may take on a variety of forms. The next several paragraphs provides a nonexhaustive, illustrative list of different tasks that may be requested by or otherwise associated with the client UIS 114, and whose facilitation of the same is done in connection with the servicing UIS 116.

A first illustrative task includes enumerating compatible applications. As previously mentioned, applications to work on a ten-foot UI are generally configured differently than if they were to work on a two-foot UI. It is beneficial for various reasons to know what software applications installed on a computer system are compatible with a specific UIS. Because the client UIS 114 is indirectly compatible with applications 124 by virtue of the servicing UIS 116, the client UIS 114 may wish to know what applications are available for it to interact with. This task might include providing the names of the various compatible software applications, where they are located, what capabilities they have, icons and other attributes associated with the application including metadata, etc. Enumerating applications include extracting whatever extractable attributes are available and associated with whatever applications are compatible with the client UIS 114.

Another illustrative task includes filtering the applications based on the respective capabilities and/or attributes. Here, the client UIS 114 may wish to know or identify all applications that include a specific attribute, say, for example, those that require a sound card (but it could be virtually anything). This task would involve specifying resources and functionality and then querying or otherwise determining from the pool of available resources those software applications that match the given criteria. Thus, the client UIS 114 may be able to identify all applications that can be used to present a picture, play a video, or record a recording, for example.

Another illustrative task includes presenting data to the user. The client UIS 114 will want to present data in presentation area 118 according to a customized format. But to interact with the various hardware components and/or software components, the servicing UIS 116 will facilitate such presentation. Even though the client UIS 114 may ultimately control various intricacies associated with presenting components such as those shown in presentation area 118, the servicing UIS 116 will work in connection with the client UIS 114 to feed it the data that is used in connection with presenting the various display components. An embodiment of the present invention includes the client UIS 114 yielding to the client UIS when UI or other data is to be presented on a display device (or devices). Thus, the client UIS 114 may yield to and allow servicing UIS 116 to present display data that is associated with applications such as applications 124.

Another illustrative task is to allow the client UIS 114 to instruct the servicing UIS 116 to launch an application, such as one of the software applications 124A-E. Here, the client UIS 114 may specify and identify or otherwise reference the desired application to be launched, and using data such as data 128A passed to the servicing UIS 116, the servicing UIS 116 will facilitate launching the desired application. Any environmental parameters such as screen size, window type, location, etc., could also be passed as data 128A.

Another task is to maintain an avenue to control the servicing UIS 116 while the servicing UIS 116 is carrying out other tasks. For example, it may be the case that while the servicing UIS 116 is completing a first task, the user instructs the computer by virtue of the client UIS 114 to move an icon or resize a window, for example. Such commands could be passed to the servicing UIS 116 even though it is concurrently facilitating the carrying out of other tasks.

Another task includes modifying or notifying the client UIS 114 of certain events that the servicing UIS 116 is to know about. For example, when the servicing UIS 116 completes a task, control may be passed back to the client UIS 114. This event of ending its activities is something that the client UIS 114 would want to be aware of so that it is prepared and ready to assume control. The servicing UIS 116 could also provide feedback such as error conditions, UI component movements, resizes, etc.

Another illustrative task includes facilitating callbacks for additional APIs back to the alternate shell; that is, the client UIS 114. Put another way, this task would make the client UIS 114 aware of something that the servicing UIS 116 thinks it should be aware. If some event or happening occurred that the servicing UIS 116 might, for example, know that it should be aware of, it will apprise the client UIS 114 of the same. In some embodiments, this task takes the form of forwarding data to the client UIS 114. For example, consider the example where a user indicates a desire to record a specific television program. That input would come by way of the client UIS 114, which would then communicate the request to the servicing UIS 116. Although no information may be passed except for an indication of the program to record, it may be the case that the servicing UIS 116 is aware of other functions that must be accomplished in connection with facilitating recording the desired show. Accordingly, the servicing UIS 116 could pass back recording information to the client UIS 114 so that it could use its own recording component or some other recording application. Often, the servicing UIS 116 offers its own functionality to accomplish events such as video recording and the like. But it may be the case that part of the client UIS 114 includes a video-recording component (or a picture-viewing component, audio-presentation component, etc.). In this case, the client UIS 114 is to present a customized display associated with recording and/or playing back a video program. And although it still needs to interact with devices such as a video-captured card for example, it may be configured to present a customized UI. As such, it will initiate a request to the servicing UIS 116, which may facilitate the intricacy associated with recording a program, and pass back data that would allow the client UIS 114 to perhaps record the program event consistent with its or another recording component. This task provides data in connection with the request from the client UIS 114.

Another illustrative task includes providing a method for the client UIS 114 to add additional functionality into the servicing UIS 116. That is, the servicing UIS 116 may be configured to grow or evolve according to data provided to it by the client UIS 114. This task includes letting an alternate shell such as the client UIS 114 extend the API set associated with the servicing UIS 116, such as API 112. An illustrative example of such a task may be something like a method wherein the client UIS wishes to present some sort of display box in presentation area 118 at some time, such as on startup for example. Maybe a picture is to be displayed, or text, or a small video clip, etc. Additional APIs can be exposed to interact with the window to enable the window to display whatever the client UIS 114 wants to be displayed. If API 112 did not include an instruction set to facilitate such interaction, then this task would include the ability to supplement API 112 with the ability to provide such interaction.

Another illustrative task relates to enabling an event to persist in the background or foreground while other changes are occurring. An illustrative example of such a task will be described with reference to inset 122. Inset 122 is an area of a UI that can perform an event (such as displaying a video, presenting a picture, depicting a camera fee, etc.) persistently while changes in the background occur. For example, it may be case that inset 122 plays a specific video recording while the user is navigating through music or video or pictures via selections made by selection area 120. More details about such an inset are described in the aforementioned copending application Ser. No. 10/174,619. This pass would allow an alternate shell such as the client UIS 114 to pass to the servicing UIS 116 information associated with the events of inset 122, which inset 122 may continue to do what it's doing while changes in the background example occur. Without the client UIS 114, where the servicing UIS 116 is the only UIS, an inset such as 122 may have the ability to persistently display or present an event because the servicing UIS 116 has access to the various hardware components or software components 124. This task would allow the client UIS 114 to do a similar thing; that is, persistently display whatever is being displayed in inset 122. By virtue of API 112, the client UIS 114 would be able to present an inset 122 or multiple instances of the inset (not shown for clarity).

Another illustrative task includes providing for the negotiation of the use of different system resources between the client UIS 114 and the servicing UIS 116. Consider this situation where a user is watching a video, for example, that is being presented by the client UIS 114. A user then initiates a command to turn to a certain channel. But it may be the case that such an action was unintended; for example, a child may be playing with the remote control while others are watching a video. In this case, perhaps confirmation is desired before stopping the video and actually changing to the indicated channel. In this situation, the instant task would allow the client UIS 114 to ask a user whether it wants to tune to the desired channel, do nothing, etc. In this example, a negotiation was necessary between two different system resources such as the resource associated with playing back a movie and the resource associated with navigating to and/or displaying a specific channel of programming. Rather than having the client UIS 114 need to know how to complete such negotiation, the servicing UIS 116 can facilitate such negotiation.

Another illustrative task that the servicing UIS 116 may facilitate is associated with initializing devices or services that require an initialization. For example, when a user unwraps a new PC and plugs it in, it may be the case that certain product offerings need to be initially configured. For example, to view television programming, it may that the PC needs to be made aware of the user's content provider, geographic location, time zone, etc. Whereas the user may be prompted to carry out such initializations absent an alternative shell such as the client UIS 114, those presentations would be suppressed by the servicing UIS 116 in one embodiment. In an embodiment, such initialization may be postponed until a user requests a service that requires such an initialization. The request would be received via the client UIS 114, which would communicate data through API 112 the servicing UIS 116, which would then provide information to the client UIS 114 that would allow the client UIS 114 to present and gather the data necessary to instantiate such an initialization. In this way, the client UIS 114 would even be able to customize such things as initializations of services that require initial configuration.

Although the number of illustrative tasks are legion, we have listed the above and the final illustrative task to convey the spirit and wide scope of tasks that could be facilitated by virtue of API 112 being present. A final illustrative task that could be carried out by virtue of API 112 being present is allowing legacy remote controls that may have been designed to work with the servicing UIS 116 to be used in connection with the client UIS 114.

Returning now to FIG. 2, having left off at step 214, the next step in an embodiment of the present invention is for the tasks to actually be completed at a step 216. Any data associated with carrying out those tasks can be received at a step 218. The above mentions several instances where data may be received back from applications such as application 124 or hardware devices in connection with carrying out the requested tasks. That data or variation thereof may then be received at the servicing UIS 116 at a step 220. If this data needs to be formatted, supplemented, or otherwise varied, such can be done as passed to UIS 114 at a step 222, which may include returning control to the client UIS 114 in one embodiment. This would allow the client UIS 114 to then present the appropriate output to a user at a step 224.

We will now discuss some illustrative examples at a lower level. We do so to provide additional examples and technical disclosure. The examples and illustrative API structures should not be construed as limiting the invention. The invention is defined by the claims below. The following modules expose various functional aspects of API 112 in one or more embodiments. Moreover, the following list of exemplary modules and syntaxes is by no means exhaustive, but illustrative.

Lower-Level Descriptions

An external or alternative shell, such as the client UIS 114, may use a component referenced herein as "IExtensibilityApplications::GetFilteredEntryPoints" to receive a list of installed DUI applications on the system and their entry points. The client UIS 114 can then direct the servicing UIS 116 to start an installed application 124 by using a component referred to herein as "IExtensibilityApplications::LaunchEntryPoint." The client UIS 114 can also start an application 124 at a URL that is not associated with an installed application by using a component referred to herein as "IExtensibilityApplications::LaunchUrl." The functionality of these three components is what is comparatively more important than a specific embodiment. But illustrative embodiments are provided in the tables below as but one way to implement the above functionally. They should not be construed to limit the present invention, which is defined by the claims below. After a hosted application is started, the application can use a component referred to herein as "IextensibilityHostControl" to control and direct the servicing UIS 116. Exemplary functionality includes exposing control to close a window, maximize a window. minimize a window, set a size and position of the window, or block execution until the window has closed.

Table 1 includes but one illustrative example of syntax for instantiating an occurrence of "IExtensibilityApplications::GetFilteredEntryPoints." Those of ordinary skill in the art will appreciate many ways to accomplish the same functionality with varying syntax, and they are contemplated within the scope of the claims below.

TABLE 1

Exemplary pseudocode for
IExtensibilityApplications::GetFilteredEntryPoints

```
HRESULT GetFilteredEntryPoints(
    BSTR strCategory,
    VARIANT_BOOL fEnabledOnly,
    IEnumVARIANT** pRetVal
);
Parameters
strCategory
        [in] Category of entry points to retrieve.
        For more information, see
        category Element.
fEnabledOnly
        [in] true if only enabled entry points are to
        be returned; otherwise, false.
pRetVal
        [out] Address of a variable that receives a
        pointer to a collection of entry
        points.
Return Value
Returns an HRESULT. Possible values include, but are not
limited to, those in the following table.
```

Table 2 includes but one illustrative example of syntax for instantiating an occurrence of "IExtensibilityApplications::LaunchEntryPoint" Those of ordinary skill in the art will appreciate many ways to accomplish the same functionality with varying syntax, and they are contemplated within the scope of the claims below.

TABLE 2

Exemplary pseudocode for
IExtensibilityApplications::LaunchEntryPoint

```
HRESULT LaunchEntryPoint(
    GUID AppId,
    GUID Id,
    int nCmdShow,
    int Left,
    int Top,
    int Right,
    int Bottom,
    IExtensibilityHostControl** pHostControl
);
Parameters
AppId
        [in] Unique identifier of the application to start.
Id
        [in] Unique identifier of the entry point.
nCmdShow
        [in] Initial state of the window, such as
        SW_MAXIMIZE. Equivalent to the
        nCmdShow parameter of the WinMain function.
Left
        [in] Left coordinate of the window rectangle.
Top
        [in] Top coordinate of the window rectangle.
Right
        [in] Right coordinate of the window rectangle.
Bottom
        [in] Bottom coordinate of the window rectangle.
pHostControl
        [out] Address of a variable that receives a
        pointer to a service control
        interface. This interface can be used to control the
        window.
Return Value
The method returns an HRESULT. Possible values include,
but are not limited to, those in the following table.
```

Table 3 includes but one illustrative example of syntax for instantiating an occurrence of "IExtensibilityApplications::LaunchUrl." Those of ordinary skill in the art will appreciate many ways to accomplish the same functionality with varying syntax, and they are contemplated within the scope of the claims below.

TABLE 3

Exemplary pseudocode for
IExtensibilityApplications::LaunchUrl

```
HRESULT LaunchUrl(
    BSTR strUrl,
    int nCmdShow,
    int Left,
    int Top,
    int Right,
    int Bottom,
    IExtensibilityHostControl** pHostControl
);
Parameters
strUrl
        [in] URL of the application.
nCmdShow
        [in] Initial state of the window, such as
        SW_MAXIMIZE. Equivalent to the
        nCmdShow parameter of the WinMain function.
Left
        [in] Left coordinate of the window rectangle.
Top
        [in] Top coordinate of the window rectangle.
Right
        [in] Right coordinate of the window rectangle.
Bottom
        [in] Bottom coordinate of the window rectangle.
pHostControl
        [out] Address of a variable that receives a
        pointer to a service control
        interface. This interface can be used to control
        the window.
Return Value
        The method returns an HRESULT. Possible values
        include, but are not
        limited to, those in the following table.
```

Four illustrative interfaces that compose or are exposed by API 112 in connection with the servicing UIS 116 are listed in Table 4.

TABLE 4

Illustrative methods exposed by "IExtensibilityEntryPoint"

| Method | Description. |
| --- | --- |
| IExtensibilityApplications | Provides a way for the client UIS 114 to find and use entry points for applications 124 and the like. |
| IExtensibilityEntryPoint | Enables the client UIS 114 to discover the attributes of an entry point. |
| IExtensibilityHostControl | Controls the window that is opened when an application is started. |
| IExtensibilityHostEvents | Represents service window events. |

Lower-level detail of each of the methods of Table 4 will now be described. In one embodiment, the IExtensibilityApplications interface exposes such methods as those listed in Table 5.

TABLE 5

Illustrative methods exposed by "IExtensibilityApplications"

| Method | Description. |
| --- | --- |
| GetFilteredEntryPoints | Gets entry points that were set when applications were registered. |
| LaunchEntryPoint | Starts the application associated with the entry point. |
| LaunchUrl | Starts the application at the specified URL. |
| put_Capabilities | Specifies the capabilities of the shell. |

The second method listed in Table 4 is referred to herein as "IExtensibilityEntryPoint," interface and is a name given to a component that composes or is exposed by API 112 to enable an alternative shell such as the client UIS 114 to discover the attributes of an entry point. Table 6 lists some illustrative methods exposed by IExtensibilityEntryPoint.

TABLE 6

Illustrative methods exposed by "IExtensibilityEntryPoint"

| Method | Description |
|---|---|
| get_AddIn | Gets the addin attribute of the entrypoint element that was set when the application was registered. |
| get_AppDescription | Gets the description attribute of the application element that was set when the application was registered. |
| get_AppId | Gets the id attribute of the application element that was set when the application was registered. |
| get_AppTitle | Gets the title attribute of the application element that was set when the application was registered. |
| get_BackgroundColor | Gets the bgColor attribute of the application element that was set when the application was registered. |
| get_CapabilitiesRequired | Gets the capabilitiesRequired element that was set when the application was registered. |
| get_Category | Gets the category element that was set when the application was registered. |
| get_CompanyLogoUrl | Gets the companyLogoUrl attribute of the application element that was set when the application was registered. |
| get_CompanyName | Gets the companyName attribute of the application element that was set when the application was registered. |
| get_Context | Gets the context attribute of the entrypoint element that was set when the application was registered. |
| get_Description | Gets the description attribute of the entrypoint element that was set when the application was registered. |
| get_Id | Gets the id attribute of the entrypoint element that was set when the application was registered. |
| get_ImageUrl | Gets the imageUrl attribute of the entrypoint element that was set when the application was registered. |
| get_NowPlayingDirective | Gets the nowPlayingDirective attribute of the application element that was set when the application was registered. |
| get_Run | Gets the run attribute of the entrypoint element that was set when the application was registered. |
| get_Subtitle | Gets the subtitle attribute of the application that was set when the application was registered. |
| get_ThumbnailImageUrl | Gets the thumbNail attribute of the application element that was set when the application was registered. |
| get_Title | Gets the title attribute of the entrypoint element that was set when the application was registered. |
| get_Url | Gets the url attribute of the entrypoint element that was set when the application was registered. |

The third method listed in Table 4 is referred to herein as "IExtensibilityHostControl," and is a name given to a component that composes or is exposed by API 112 to control a window that is opened when an application is started. Table 7 lists some illustrative methods exposed by IExtensibility-HostControl.

TABLE 7

Illustrative methods exposed by "IExtensibilityHostControl"

| Method | Description. |
|---|---|
| Close | Closes the window. |
| Maximize | Maximizes the window. |
| Minimize | Minimizes the window. |
| SetPosition | Sets the size and position of the window. |
| WaitForClose | Blocks execution until the window has closed. |

The fourth and final illustrative method listed in Table 4 is referred to herein as "IExtensibilityHostEvents," and is a name given to a component that composes or is exposed by API 112 to represents service window events. Table 8 lists some illustrative methods exposed by IExtensibility-HostEvents.

TABLE 8

Illustrative methods exposed by "IExtensibilityHostEvents"

| Method | Description. |
|---|---|
| Closed | Signaled when the service window is closed. |

We reiterate that the nature of programming is often individualistic, as there are many ways for a programmer to skin the allegorical cat. This is not a copyright application, but a patent application. This disclosure supports the claims below, but it is the claims that define the invention.

Exemplary Operating Environment

Figure 3:
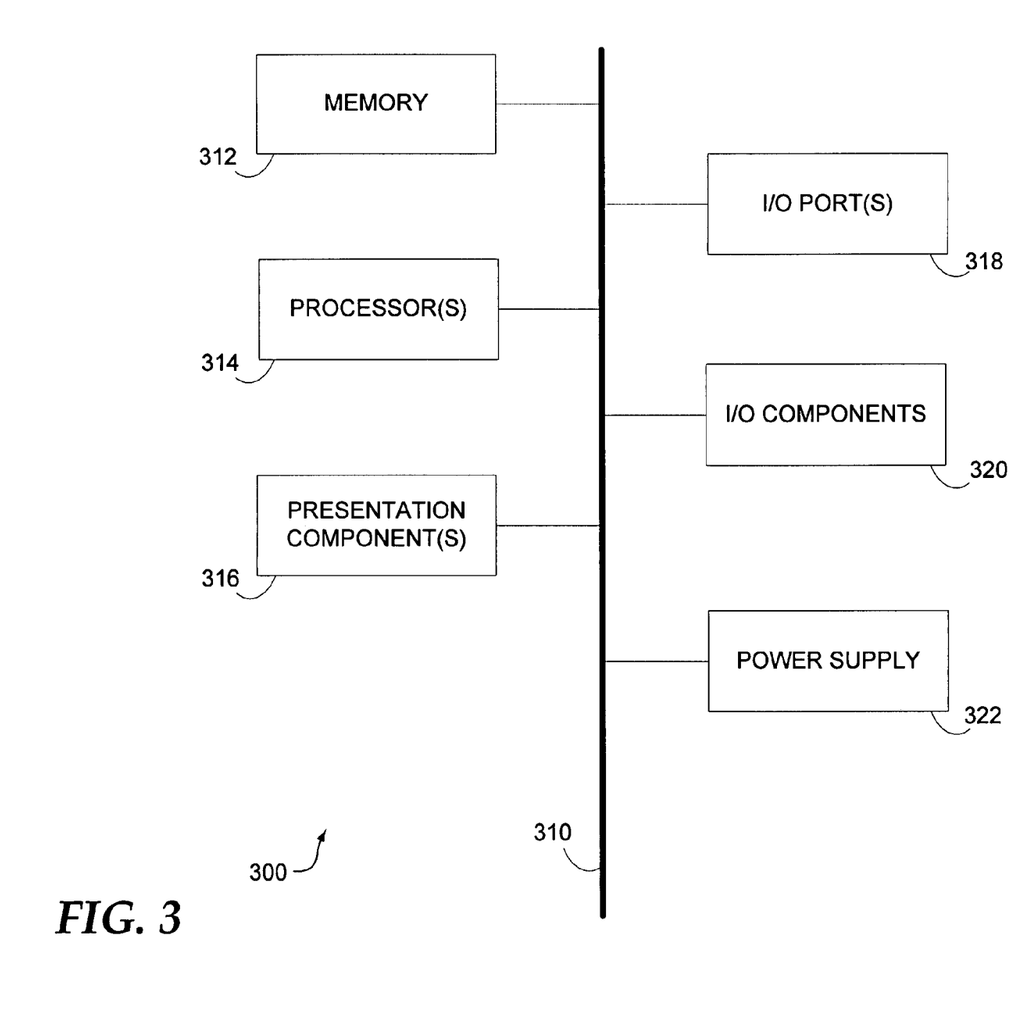
FIG. 3 is an exemplary operating environment suitable for practicing an embodiment of the present invention.

Referring to FIG. 3 in particular, an exemplary operating environment for implementing the present invention is shown and designated generally as computing device 300. Computing device 300 is but one example of a suitable computing environment and is not intended to suggest any limitation as to the scope of use or functionality of the invention. Neither should the computing-environment 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 3, computing device 300 includes a bus 310 that directly or indirectly couples the following devices: memory 312, one or more processors 314, one or more presentation components 316, input/output ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

Computing device 300 typically includes a variety of computer-readable media, which is nontransitory, though the data stored might be transitory, the computer-readable media is not. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other physical medium that can be used to encode desired information and be accessed by computing device 300.

Memory 312 includes computer-storage media in the form of volatile and/or nonvolatile memory. The memory may be removable, nonremovable, or a combination thereof. Exemplary hardware devices include solid-state memory, hard drives, optical-disc drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc. I/O ports 318 allow computing device 300 to be logically coupled to other devices including I/O components 320, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-executable instructions embodied thereon that, when executed by a computing device, facilitate a method of presenting components of a presented user-interface shell (UIS) that cooperates with a servicing UIS, the method comprising:
   receiving data by the presented UIS indicative of one or more tasks to be completed;
   communicating the data from the presented UIS to the servicing UIS via an application programming interface (API);
   coordinating the completion of the one or more tasks with one or more applications coupled to the servicing UIS that interacts directly with the one or more applications, wherein the servicing UIS and the presented UIS are displayable interfaces, and wherein the coordinating comprises:
      issuing a set of commands to the one or more applications coupled to the servicing UIS; and
      receiving return data from the one or more applications in connection with issuing the set of commands; and
   returning control to the presented UIS.

2. The computer-readable media of claim 1, wherein said one or more tasks include at least one of the following:
   processing return data returned from the one or more applications to depict a presentation based on said return data to a user;
   enabling the presented UIS to instruct said servicing UIS to launch an application;
   enabling the presented UIS to specify reference to an application;
   enabling the presented UIS to specify environmental parameters;
   controlling aspects of the servicing UIS;
   facilitating call-back routines for additional APIs back to the presented UIS;
   enumerating compatible applications, the compatible applications being applications that are compatible with the servicing UIS;
   filtering the compatible applications based on one or more attributes associated with the compatible applications;
   providing a method for the presented UIS to supplement functional aspects of the servicing UIS;
   negotiating usage of one or more system resources between the servicing UIS and the presented UIS;
   providing for persistent presentation of a media experience as presentation changes of the presented UIS occur; and
   facilitating a first-run experience that is associated with an application-initiation routine.

3. The computer-readable media of claim 2, wherein enabling the presented UIS to specify a reference to an application includes specifying a location of the application; and wherein the environmental parameters comprise one or more of: a screen location to present an object, a window-mode attribute including whether a window should be minimized, maximized, modal, sizeable, or a given size.

4. The computer-readable media of claim 2, wherein controlling aspects of the servicing UIS includes resizing an item, changing visual attributes of an item, and/or specifying an alternative reference including a URL.

5. The computer-readable media of claim 2, wherein filtering the compatible applications based on one or more attributes includes filtering the compatible applications based on dependencies on another resource, the another resource comprising one or more of a peripheral device or of another application.

6. The computer-readable media of claim 2, wherein providing for persistent presentation of a media experience includes providing for the persistence of one or more of the following:
   a slide-show presentation;
   a video presentation, including a camera-feed presentation;
   an audio presentation; and
   a data presentation.

7. The computer-readable media of claim 2, wherein facilitating a first-run experience includes one or more of the following:
   initializing a media-programming guide; and
   configuring a resource device.

8. A computer that includes the computer-readable media of claim 1.

* * * * *